United States Patent
Oomori (10) Patent No.: US 11,803,091 B2
(45) Date of Patent: Oct. 31, 2023

(54) DISPLAY DEVICE HAVING MIRROR FUNCTION

(71) Applicant: Japan Display Inc., Tokyo (JP)

(72) Inventor: Yuuji Oomori, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/846,105

(22) Filed: Jun. 22, 2022

(65) Prior Publication Data

US 2022/0413349 A1    Dec. 29, 2022

(30) Foreign Application Priority Data

Jun. 25, 2021 (JP) .................... 2021-105287

(51) Int. Cl.
G02F 1/1362 (2006.01)

(52) U.S. Cl.
CPC .............................. G02F 1/136286 (2013.01)

(58) Field of Classification Search
CPC .................................................. G02F 1/1362
See application file for complete search history.

(56) References Cited

U.S. PATENT DOCUMENTS

| | | |
|---|---|---|
| 10,775,536 B2 | 9/2020 | Fukui et al. |
| 11,340,508 B2 | 5/2022 | Sugiyama et al. |
| 2005/0185278 A1* | 8/2005 | Horsten ............ G02F 1/133536 359/485.01 |
| 2019/0163014 A1* | 5/2019 | Sugiyama ............ G02B 6/0091 |
| 2019/0331955 A1* | 10/2019 | Lee ....................... G02F 1/13476 |
| 2020/0271995 A1* | 8/2020 | Weindorf .......... G02F 1/133603 |
| 2021/0132389 A1* | 5/2021 | Miyao ........................ G02B 1/14 |
| 2021/0286226 A1* | 9/2021 | Sugiyama ......... G02F 1/136213 |
| 2021/0397035 A1* | 12/2021 | Ochi ................. G02F 1/133308 |

FOREIGN PATENT DOCUMENTS

| | | | | |
|---|---|---|---|---|
| CN | 110931540 | * | 7/2022 | ............. H01L 51/56 |
| JP | H08-173285 A | | 7/1996 | |
| JP | 2020-091400 A | | 6/2020 | |
| JP | 6794984 B2 | | 12/2020 | |

* cited by examiner

Primary Examiner — Sang V Nguyen
(74) Attorney, Agent, or Firm — Michael Best & Friedrich LLP (57) ABSTRACT

A display device includes a display region, a peripheral region, a first substrate, a second substrate having a side surface, a liquid crystal layer arranged between the first substrate and the second substrate, a side light source device mounted on a front surface of the first substrate and arranged at a position facing the side surface of the second substrate, and a light reflection film formed on either a side with a back surface of the first substrate or a side with a front surface of the second substrate. The light reflection film covers the entire display region.

6 Claims, 11 Drawing Sheets

DISPLAY DEVICE HAVING MIRROR FUNCTION

CROSS REFERENCE TO RELATED APPLICATIONS

The present application claims priority to Japanese Patent Application No. 2021-105287 filed on Jun. 25, 2021, the disclosure of which is incorporated herein by reference.

TECHNICAL FIELD OF THE INVENTION

The present invention relates to a display device using a liquid crystal layer.

BACKGROUND OF THE INVENTION

As a display device using a liquid crystal layer, a transparent display device that allows an observer to recognize the display image and background superimposed on each other by improving the light transmittance of substrates sandwiching the liquid crystal layer has been known (see Japanese Unexamined Patent Application Publication No. 2020-91400 (Patent Document 1)).

SUMMARY OF THE INVENTION

The inventor of this application conducted a study about the smart mirror that allows an observer to recognize an image reflected on a mirror and an image displayed by a display device, which are superimposed on each other. For example, as described in Japanese Unexamined Patent Application Publication No. H08-173285 (Patent Document 2) and Japanese Patent No. 6794984 (Patent Document 3), a mirror equipped with a display device in which a mirror and a display device are combined has been known. As described in these Patent Documents, members required for image display such as a light source device are arranged in a region to which a display function is provided. In this case, since the region to which a display function is provided has a lower visible light transmittance as compared with the other regions, the performance as a mirror is degraded. Therefore, in order to exert the performance as a mirror, the region to which the display function can be provided is limited to a part of the entire mirror surface.

An object of the present invention is to provide a technology capable of improving the performance of the display device having the function as a mirror and the display function.

Means for Solving the Problem

A display device according to an aspect of the present invention includes a display region, a peripheral region provided so as to surround the display region, a first substrate having a first front surface and a first back surface on an opposite side of the first front surface, a second substrate having a second back surface facing the first front surface, a second front surface on an opposite side of the second back surface, and a first side surface which is located between the second front surface and the second back surface and intersects with the second front surface and the second back surface, a liquid crystal layer arranged between the first substrate and the second substrate, a light source device mounted on the first front surface of the first substrate and arranged at a position facing the first side surface of the second substrate, and a light reflection film formed on either a side with the first back surface of the first substrate or a side with the second front surface of the second substrate. The light reflection film covers the entire display region.

DESCRIPTIONS OF THE PREFERRED EMBODIMENTS

Hereinafter, each embodiment of the present invention will be described with reference to the accompanying drawings. Note that the disclosure is mere an example, and it is a matter of course that any alteration that is easily made by a person skilled in the art while keeping a gist of the present invention is included in the range of the present invention. In addition, the drawings schematically illustrate a width, a thickness, a shape, and the like of each portion as compared to actual aspects in order to make the description clearer, but the drawings are mere examples and do not limit the interpretation of the present invention. Further, the same or related reference characters are applied to the same elements as those described in relation to the foregoing drawings in the present specification and the respective drawings, and detailed descriptions thereof will be appropriately omitted in some cases.

In the following embodiment, a liquid crystal display device configured to display various images in a display region will be described as an example of a display device having a liquid crystal layer.

Also, a liquid crystal display device is a device that forms a display image by changing the orientation of molecules contained in the liquid crystal layer, but requires a light source. In the present embodiment, a display device in which a light source is provided on the side of a display panel including a liquid crystal layer will be described as an example. However, there are various modifications of the embodiment described below, and for example, the technology described below can be applied to a liquid crystal display device in which a light source is arranged on the back side of the display panel.

<Configuration of Display Panel>

Figure 1:
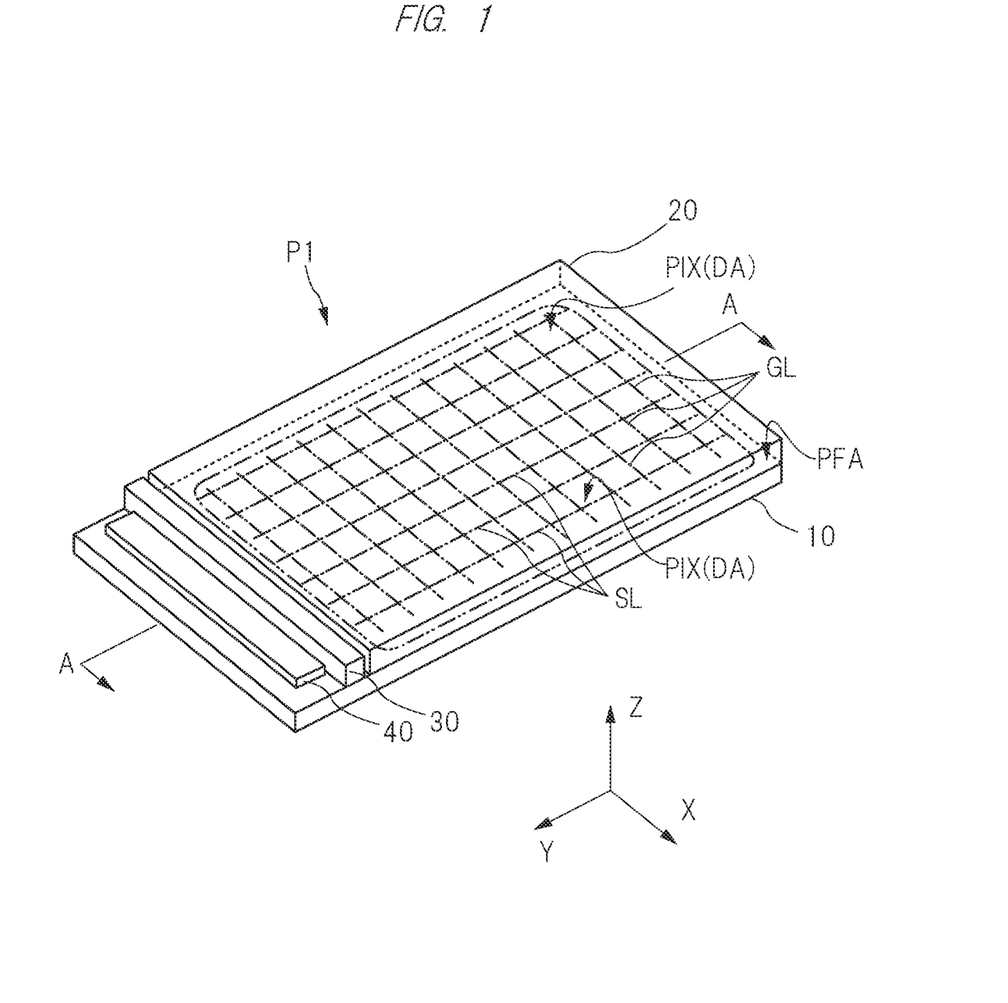
FIG. 1 is a perspective view showing an example of a display device according to an embodiment.
Figure 2:
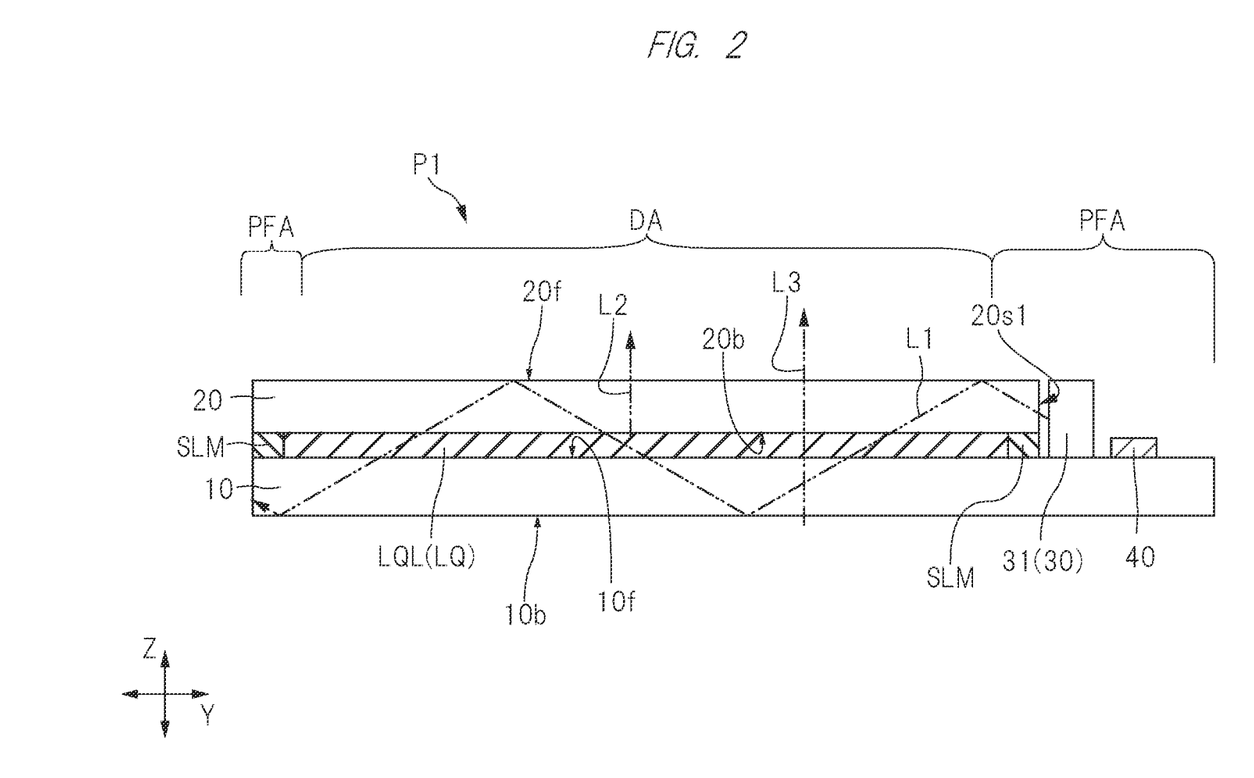
FIG. 2 is a cross-sectional view taken along the line A-A in FIG. 1.

First, a configuration of the display panel will be described. FIG. 1 is a perspective view showing an example of the display panel according to the present embodiment. In FIG. 1, the boundary between a display region DA and a peripheral region PFA is shown by an alternate long and two short dashes line. Further, in FIG. 1, a part of the signal wiring for transmitting the signal for driving the liquid crystal (specifically, a gate line GL and a source line SL) in the circuit provided in a display panel P1 is schematically shown by an alternate long and short dash line. In the description with reference to the following drawings including FIG. 1, the direction along the thickness direction of the display panel P1 is defined as the Z direction, the extending direction of one side of the display panel P1 in the X-Y plane orthogonal to the Z direction is defined as the X direction, and the direction intersecting with the X direction is defined as the Y direction. FIG. 2 is a cross-sectional view taken along the line A-A in FIG. 1.

As shown in FIG. 1, the display panel P1 of the present embodiment includes a substrate (array substrate) 10, a substrate (counter substrate) 20, a side light source device 30, and a drive circuit 40. The display panel P1 may include, for example, a control circuit, a flexible substrate connected to the display panel P1, a housing, and the like, in addition to the parts provided in the display panel P1 shown in FIG. 1. In FIG. 1, illustration of the parts other than the display panel P1 is omitted. The display panel P1 has the display region DA in which an image is formed in accordance with an input signal supplied from outside and the peripheral region (frame region) PFA around the display region DA. Although the display region DA of the display panel P1 shown in FIG. 1 is a quadrangle, the display region may have a shape other than a quadrangle such as a polygon or a circle. The display region DA is an effective region in which the display panel P1 displays an image on the display surface in a plan view. Each of the substrates 10 and 20 is located at a position overlapping with the display region DA in a plan view. Each of the side light source device 30 and the drive circuit 40 is mounted on the substrate 10.

As shown in FIG. 2, the display panel P1 includes the substrate 10 and the substrate 20 bonded so as to face each other with interposing a liquid crystal layer LQL therebetween. The substrate 10 and the substrate 20 are arranged in the Z direction which is the thickness direction of the display panel P1. In other words, the substrate 10 and the substrate 20 face each other in the thickness direction (Z direction) of the display panel P1. The substrate 10 has a front surface (main surface, surface) 10f facing the liquid crystal layer LQL (and the substrate 20). Further, the substrate 20 has a back surface (main surface, surface) 20b facing the front surface 10f of the substrate 10 (and the liquid crystal layer LQL). The substrate 10 is an array substrate in which a plurality of transistors (transistor elements) as switching elements (active elements) Tr (see FIG. 5) are arranged in an array. Also, the substrate 20 is a substrate provided on the side with the display surface. The substrate 20 can be restated as a counter substrate in the sense that it is a substrate arranged so as to face the array substrate.

The liquid crystal layer LQL containing liquid crystal LQ is located between the front surface 10f of the substrate 10 and the back surface 20b of the substrate 20. The liquid crystal layer LQL is an optical modulation element. The display panel P1 has a function of modulating the light passing therethrough by controlling the state of the electric field formed around the liquid crystal layer LQL via the switching element described above. The display region DA on the substrate 10 and the substrate 20 is superimposed on the liquid crystal layer LQL as shown in FIG. 2.

Further, the substrate 10 and the substrate 20 are adhered to each other via a sealing portion (sealing material) SLM. As shown in FIG. 1 and FIG. 2, the sealing portion SLM (see FIG. 2) is arranged in the peripheral region PFA so as to surround the display region DA. The liquid crystal layer LQL is present inside the sealing portion SLM as shown in FIG. 2. The sealing portion SLM serves as a seal for enclosing the liquid crystal between the substrate 10 and the substrate 20. Further, the sealing portion SLM serves as an adhesive material for adhering the substrate 10 and the substrate 20.

The side light source device 30 has a light source unit 31. The light source unit 31 is arranged at a position facing a side surface 20s1 of the substrate 20. As schematically shown by an alternate long and two short dashes line in FIG. 2, the light source light L1 emitted from the light source unit 31 propagates in a direction away from the side surface 20s1 while being reflected by the back surface 10b of the substrate 10 and the front surface 20f of the substrate 20. In the propagation path of the light source light L1, the back surface 10b of the substrate 10 and the front surface 20f of the substrate 20 are interfaces between a medium having a large refractive index and a medium having a small refractive index. Therefore, when the incident angle at which the light source light L1 is incident on the front surface 20f and the back surface 10b is larger than the critical angle, the light source light L1 is totally reflected on the front surface 20f and the back surface 10b.

The liquid crystal LQ is a polymer-dispersed liquid crystal LC and contains a liquid crystal polymer and liquid crystal molecules. The liquid crystal polymer is formed in a streak pattern, and the liquid crystal molecules are dispersed in the gaps of the liquid crystal polymer. Each of the liquid crystal polymer and the liquid crystal molecules has optical anisotropy or refractive index anisotropy. The responsiveness of the liquid crystal polymer to the electric field is lower than the responsiveness of the liquid crystal molecule to the electric field. The orientation direction of the liquid crystal polymer hardly changes regardless of the present or absence of an electric field. On the other hand, the orientation direction of the liquid crystal molecules changes in accordance with the electric field in the state where a voltage higher than the threshold value is applied to the liquid crystal LQ. When no voltage is applied to the liquid crystal LQ, the optical axes of the liquid crystal polymer and the liquid crystal molecules are parallel to each other, and the light source light L1 incident on the liquid crystal layer LQL is hardly scattered in the liquid crystal layer LQL and is transmitted (transparent state). In the state where a voltage is applied to the liquid crystal LQ, the optical axes of the liquid crystal polymer and the liquid crystal molecules intersect each other, and the light source light L1 incident on the liquid crystal LQ is scattered in the liquid crystal layer LQL (scattering state). The display panel P1 controls the transparent state and the scattering state by controlling the orientation of the liquid crystal LQ in the propagation path of the light source light L1. In the scattering state, the light source light L1 is emitted as the emitted light L2 by the liquid crystal LQ from the front surface 20f to the outside of the display panel P1. Further, the background light L3 incident from the back surface 10b passes through the substrate 10, the liquid crystal layer LQL, and the substrate 20, and is emitted to the outside from the front surface 20f. The emitted light L2 and the background light L3 are visually recognized by the observer located on the side with the front surface 20f. The observer can recognize the emitted light L2 and the background light L3 in combination. The display device with which the observer can recognize the display image and the background superimposed on each other as described above is referred to as a transparent display device.

<Transparent Display Device>

Figure 3:
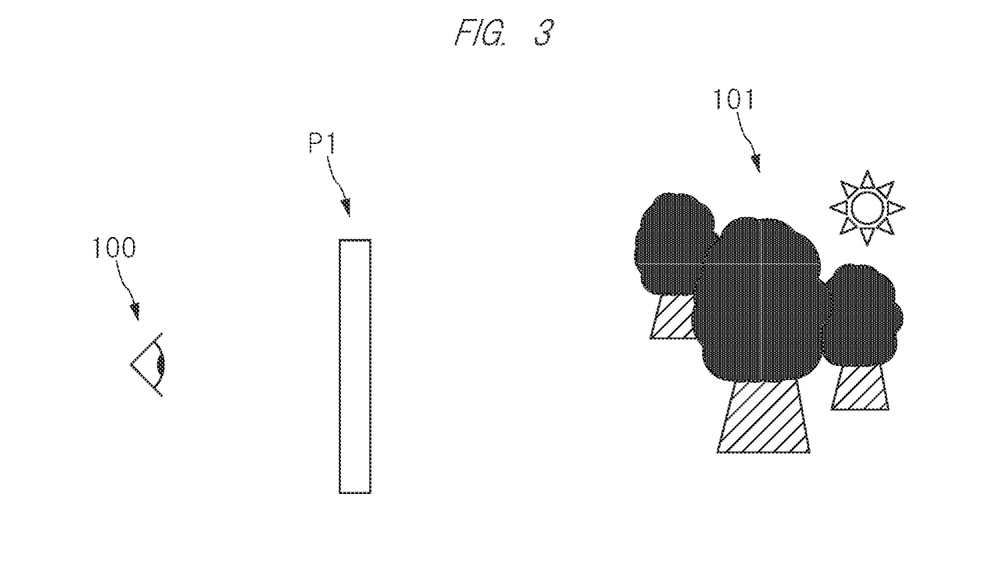
FIG. 3 is an explanatory diagram showing the positional relationship when a viewer located on one side of a transparent display device visually recognizes a background on the other side through the transparent display device.
Figure 4:
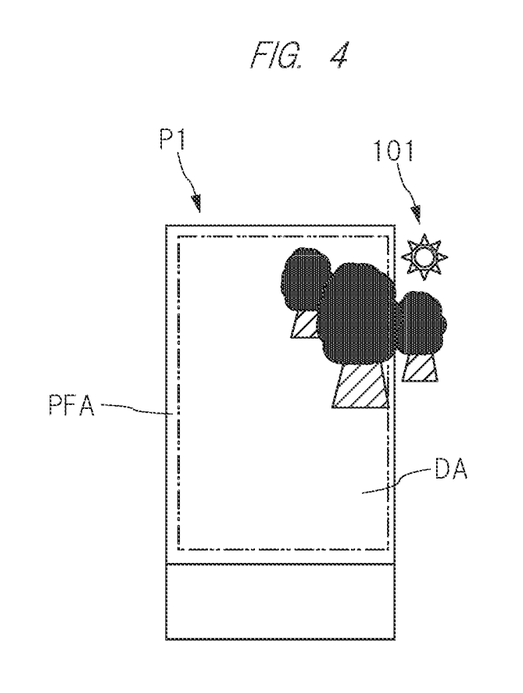
FIG. 4 is an explanatory diagram showing an example of the background visually recognized through the transparent display device.

Next, features of the transparent display device will be described. FIG. 3 is an explanatory diagram showing the positional relationship when a viewer located on one side of a transparent display device visually recognizes a background on the other side through the transparent display device. FIG. 4 is an explanatory diagram showing an example of the background visually recognized through the transparent display device.

As shown in FIG. 3, when a viewer 100 sees from one side of the display panel P1 to the other side, a background 101 is visually recognized through the display panel P1. As shown in FIG. 4, when both the display region DA and the peripheral region PFA outside the display region DA transmit light, the entire background 101 can be visually recognized without discomfort. On the other hand, when the peripheral region PFA has a light blocking property for preventing the light transmission, a part of the background 101 visually recognized through the display panel P1 is blocked by the peripheral region PFA, so that it may give a sense of discomfort to the observer 100 (see FIG. 3). As described above, in the case of the transparent display device, it is preferable that each of the display region DA and the peripheral region PFA has transmission characteristics for visible light. Also, from the viewpoint of visually recognizing the background 101 without discomfort, it is particularly preferable that the display region DA and the peripheral region PFA have almost the same transmission characteristics for visible light.

<Configuration Example of Circuit>

Figure 5:
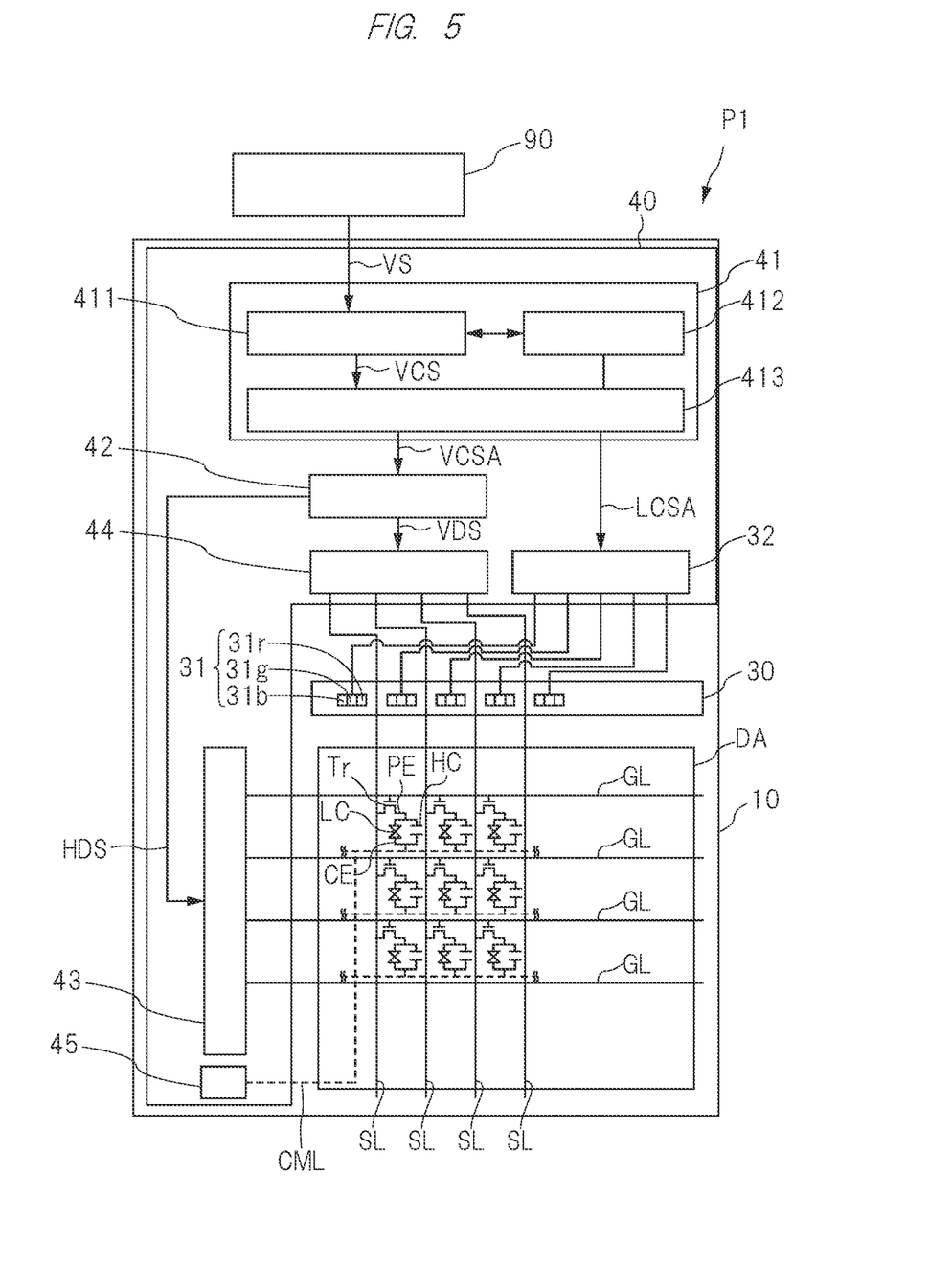
FIG. 5 is a circuit block diagram showing an example of a circuit provided in the display device in FIG. 1.

Next, a configuration example of the circuit provided in the display panel P1 shown in FIG. 1 will be described. FIG. 5 is a circuit block diagram showing an example of the circuit provided in the display panel in FIG. 1. For example, the wiring path connected to a common electrode CE shown in FIG. 5 is formed on the substrate 20 shown in FIG. 2. In FIG. 5, the wiring formed on the substrate 20 is shown by a dotted line. In the example shown in FIG. 5, a light source control unit 32 is included in the drive circuit 40. As a modification, the light source control unit 32 may be provided separately from the drive circuit 40. For example, the light source control unit 32 is formed on a wiring board (not shown) connected to the side light source device 30 shown in FIG. 1 and is electrically connected to the light source unit 31 via the wiring board.

In the example shown in FIG. 5, the drive circuit 40 includes a signal processing circuit 41, a pixel processing circuit 42, a gate drive circuit 43, a source drive circuit 44, and a common potential drive circuit 45. Further, the light source unit 31 includes, for example, a red light source unit 31r, a green light source unit 31g, and a blue light source unit 31b. As shown in FIG. 1, since the substrate 10 has a larger area than that of the substrate 20, each of the drive circuit 40 and the side light source device 30 is provided on the substrate 10.

The signal processing circuit 41 includes an input signal analysis unit (input signal analysis circuit) 411, a storage unit (storage circuit) 412, and a signal adjustment unit 413. The display panel P1 includes a control unit 90 having a control circuit for controlling the image display, and the input signal VS is input to the input signal analysis unit 411 of the signal processing circuit 41 from the control unit 90 via a wiring path of a flexible wiring board or the like (not shown). The input signal analysis unit 411 performs analysis processing based on the input signal VS input from the outside, and generates the input signal VCS. The input signal VCS is, for example, a signal that determines what kind of gradation value is given to each pixel PIX (see FIG. 1) of the display panel P1 (see FIG. 1) based on the input signal VS.

The signal adjustment unit 413 generates the input signal VCSA from the input signal VCS input from the input signal analysis unit 411. The signal adjustment unit 413 sends the input signal VCSA to the pixel control circuit 42, and sends the light source control signal LCSA to the light source control unit 32. The light source control signal LCSA is, for example, a signal including the information of the amount of light of the light source unit 31 set in accordance with the input gradation value to the pixel PIX. For example, when a dark image is displayed, the amount of light of the light source unit 31 is set small. When a bright image is displayed, the amount of light of the light source unit 31 is set large.

The pixel control circuit 42 generates the horizontal drive signal HDS and the vertical drive signal VDS based on the input signal VCSA. For example, since the field sequential method is adopted for driving in the present embodiment, the horizontal drive signal HDS and the vertical drive signal VDS are generated for each color of light that the light source unit 31 can emit. The gate drive circuit 43 sequentially selects the gate line GL of the display panel P1 (see FIG. 1) within one vertical scanning period based on the horizontal drive signal HDS. The order of selection of the gate line GL is arbitrary. As shown in FIG. 1, a plurality of gate lines (signal wiring) GL extend in the X direction and are arranged along the Y direction.

The source drive circuit 44 supplies the gradation signal in accordance with the output gradation value of each pixel PIX (see FIG. 1) to each source line SL of the display panel P1 (see FIG. 1) within one horizontal scanning period based on the vertical drive signal VDS. As shown in FIG. 1, the plurality of source lines (signal wiring) SL extend in the Y direction and are arranged along the X direction. One pixel PIX is formed at each intersection of the gate line GL and the source line SL. A switching element Tr (see FIG. 5) is formed at each portion where the gate line GL and the source line SL intersect. The plurality of gate lines GL and the plurality of source lines SL shown in FIG. 1 and FIG. 5 correspond to a plurality of signal wirings for transmitting the drive signal for driving the liquid crystal LQ shown in FIG. 2.

For example, a thin film transistor is used as the switching element Tr shown in FIG. 5. The type of the thin film transistor is not particularly limited, and examples thereof include the following transistors. When classified by the position of the gate, a bottom gate transistor and a top gate transistor can be presented. Further, when classified by the number of gates, a single gate thin film transistor and a double gate thin film transistor can be presented. One of the source electrode and the drain electrode of the switching element Tr is connected to the source line SL, the gate electrode is connected to the gate line GL, and the other of the source electrode and the drain electrode is connected to one end of the capacitor of the polymer-dispersed liquid crystal LC (liquid crystal LQ shown in FIG. 2). One end of the capacitor of the polymer-dispersed liquid crystal LC is connected to the switching element Tr via the pixel electrode PE, and the other end is connected to the common potential wiring CML via the common electrode CE. Further, a holding capacitor HC is generated between the pixel electrode PE and the holding capacitor electrode electrically connected to the common potential wiring CML. The common potential wiring CML is supplied from the common potential drive circuit 45.

<Display Device Having Mirror Function>

Figure 6:
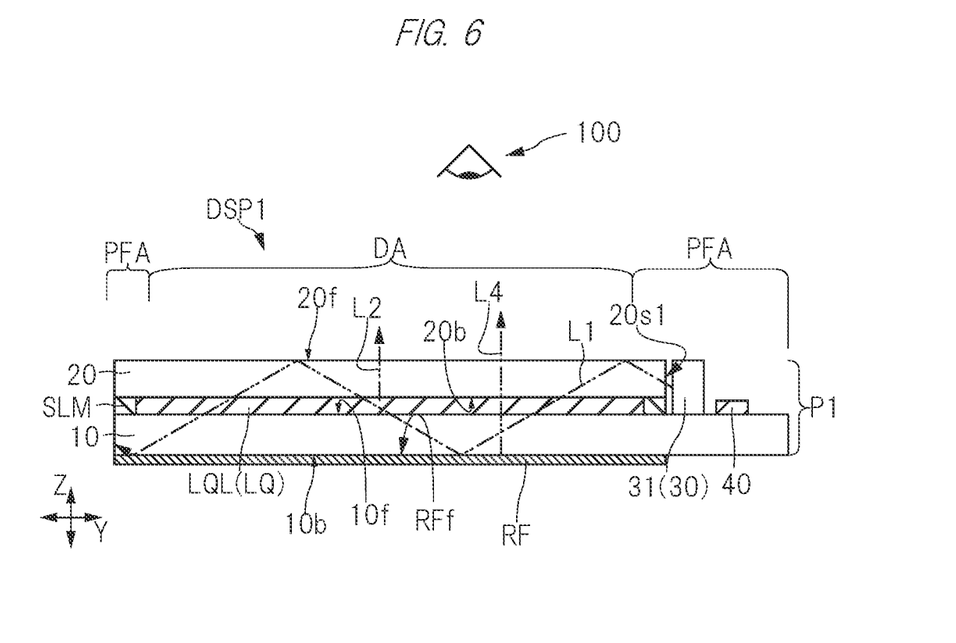
FIG. 6 is a cross-sectional view of a display device in which a light reflection film is attached to a back surface side of the display device shown in FIG. 2.
Figure 7:
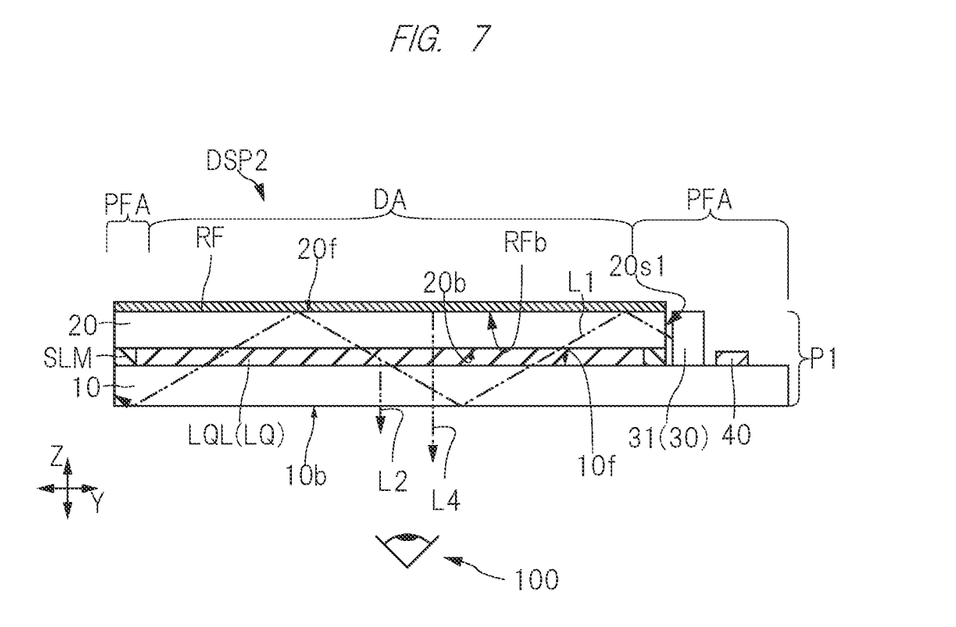
FIG. 7 is a cross-sectional view of a display device in which a light reflection film is attached to a front surface side of the display device shown in FIG. 2.

Next, the configuration of the display device having a mirror function in which a light reflection film is attached to the display panel P1 described with reference to FIG. 1 to FIG. 5 will be described. FIG. 6 is a cross-sectional view of a display device in which a light reflection film is attached to a back surface side of the display device shown in FIG. 2. FIG. 7 is a cross-sectional view of a display device in which a light reflection film is attached to a front surface side of the display device shown in FIG. 2.

In the case of the display device DSP1 shown in FIG. 6, a light reflection film RF is formed on a side with the back surface 10b of the substrate 10. The light reflection film RF covers the entire display region DA. Alternatively, the light reflection film RF may cover the entire display region DA and peripheral region PFA. The light reflection film RF is made of, for example, a metal film or the like, and has optical properties of specularly reflecting visible light. In the example shown in FIG. 6, a front surface RFf of the light reflection film RF facing the back surface 10b of the substrate 10 serves as a mirror surface.

As shown in FIG. 6, in the case of the display device DSP1, it is assumed that the observer 100 observes the display device DSP1 from the front side of the front surface 20f of the substrate 20 in the Z direction. When the display device DSP1 is operating in the mirror mode, the reflected light L4 is visually recognized by the observer 100. The reflected light L4 is the light obtained by reflecting the light, which has entered from the side with the substrate 20 of the display device DSP1 and has been transmitted through the liquid crystal LQ, mainly by the light reflection film RF. In the case of the present embodiment, since the image is displayed by using the light source light L1 emitted from the side light source device 30 to the side surface 20s1 of the substrate 20, the visible light transmittance of each member arranged in the display region DA is very high. For example, the visible light transmittance of the portion of the display panel P1 excluding the light reflection film RF is 80% or more. The display panel P1 is a liquid crystal display device, and is different from an OLED (Organic Light-Emitting Diode) display device. In the case of a liquid crystal display device, the number of thin film transistors formed in one pixel and the number of wirings connected to the thin film transistors are smaller than those of the OLED display device. Therefore, it is easy to obtain an extremely high transmittance as compared with the case of using an OLED display device. As described above, by attaching the light reflection film RF to the display panel P1 that can obtain high visible light transmittance, the function of the display device DSP1 as a mirror can be improved.

On the other hand, when the display device DSP1 is operating in the image display mode, the observer 100 visually recognizes the light (emitted light L2) emitted from the side with the front surface 20f to the outside of the display panel P1 as the emitted light L2. At this time, since the observer 100 can visually recognize the reflected light L4 and the emitted light L2 at the same time, the observer 100 can recognize the image reflected on the mirror and the image displayed by the display function in combination.

In the case of the display device DSP2 shown in FIG. 7, the light reflection film RF is formed on the side with the front surface 20f of the substrate 20. The light reflection film RF covers the entire display region DA. The light reflection film RF is made of, for example, a metal film or the like, and has optical properties of specularly reflecting visible light. In the example shown in FIG. 7, a back surface RFb of the light reflection film RF facing the front surface 20f of the substrate 20 serves as a mirror surface. Further, in the example shown in FIG. 7, the entire front surface 20f of the substrate 20 is covered with the light reflection film RF.

As shown in FIG. 7, in the case of the display device DSP2, it is assumed that the observer 100 observes the display device DSP2 from behind the back surface 10b of the substrate 10 in the Z direction. When the display device DSP2 is operating in the mirror mode, the reflected light L4 is visually recognized by the observer 100. The reflected light L4 is the light obtained by reflecting the light, which has entered from the side with the substrate 10 of the display device DSP2 and has been transmitted through the liquid crystal LQ, mainly by the light reflection film RF. As described above, also in the case of the display device DSP2 shown in FIG. 7, by attaching the light reflection film RF to the display panel P1 that can obtain high visible light transmittance, the function of the display device DSP1 as a mirror can be improved.

On the other hand, when the display device DSP2 is operating in the image display mode, the observer 100 visually recognizes the light (emitted light L2) emitted from the side with the back surface 10b to the outside of the display panel P1 as the emitted light L2. At this time, since the observer 100 can visually recognize the reflected light L4 and the emitted light L2 at the same time, the observer 100 can recognize the image reflected on the mirror and the image displayed by the display function in combination.

<First Modification>

Figure 8:
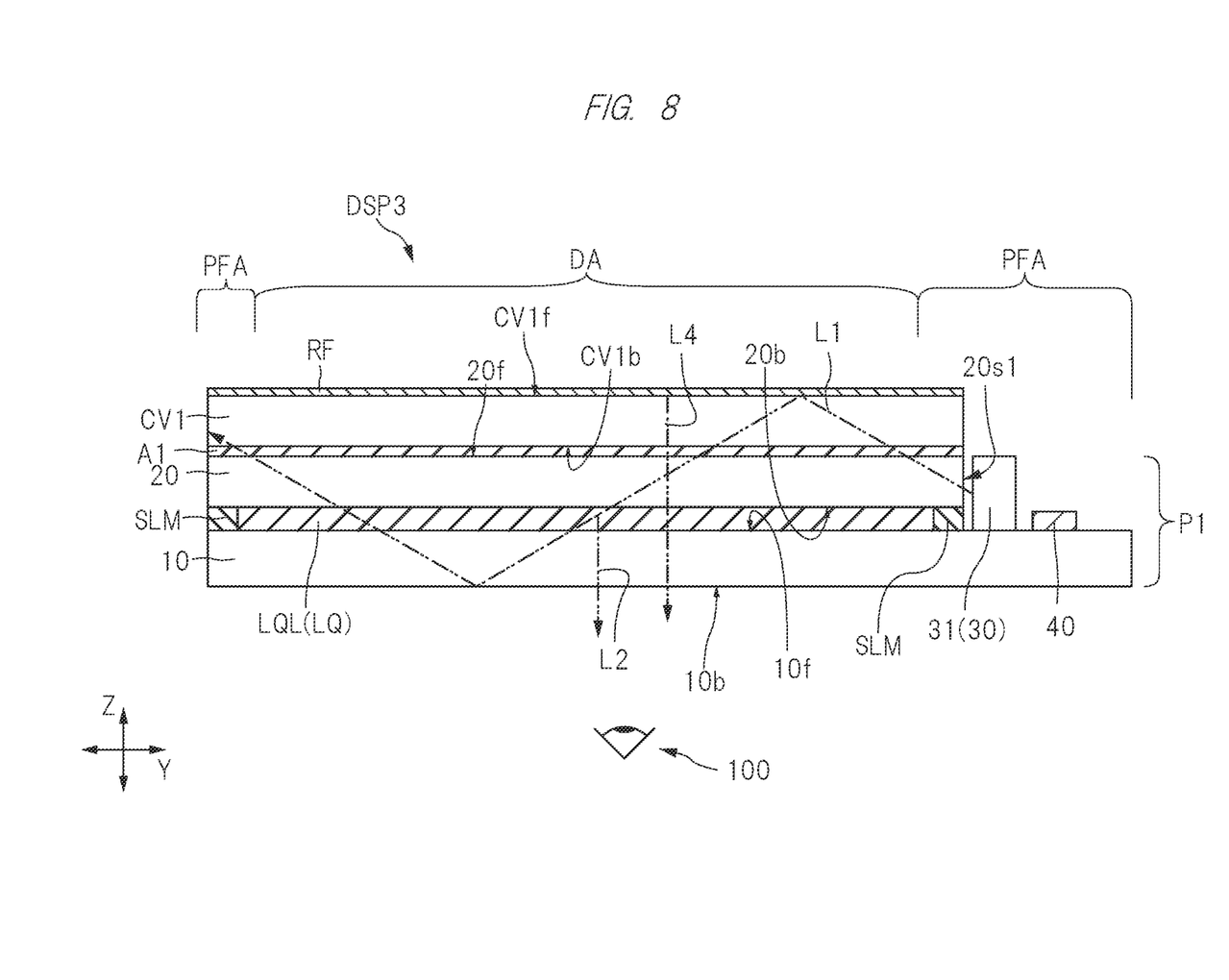
FIG. 8 is a cross-sectional view showing a modification of the display device shown in FIG. 7.

Next, a typical modification of the display device shown in FIG. 6 and FIG. 7 will be described. FIG. 8 is a cross-sectional view showing a modification of the display device shown in FIG. 7. The display device DSP3 shown in FIG. 8 differs from the display device DSP2 shown in FIG. 7 in the following points. That is, the display device DSP3 further includes a cover member CV1. The cover member CV1 has a back surface CV1b facing the front surface 20f of the substrate 20 and a front surface CV1f on the opposite side of the back surface CV1b. The cover member CV1 is adhered and fixed on the front surface 20f of the substrate 20 via an adhesive layer A1. The light reflection film RF is formed on the front surface CV1f of the cover member CV1.

The cover member CV1 is, for example, a glass plate. In order to make specular reflection dominant in the mirror surface of the light reflection film RF, it is necessary to improve the flatness of the mirror surface. Forming the light reflection film RF directly on the back surface 10b of the substrate 10 as in the display device DSP1 shown in FIG. 6 or forming the light reflection film RF directly on the front surface 20f of the substrate 20 as in the display device DSP2 shown in FIG. 7 is technically possible. However, in the case of more easily forming the light reflection film RF having a flat mirror surface, the method of forming the light reflection film RF on one surface of the cover member CV1 as shown in FIG. 8 is preferable.

In the case of the method in which the cover member CV1 having the light reflection film RF formed thereon is attached to the display panel P1 as in the display device DSP3, the light reflection film RF can be formed independently of the manufacturing process of the display panel P1. Therefore, it is easy to form the light reflection film RF, and it is possible to form the high quality light reflection film RF having high reflectance.

The adhesive layer A1 for attaching the cover member CV1 having the light reflection film RF formed thereon to the substrate 20 of the display panel P1 is made of an adhesive having a property of transmitting visible light. The adhesive layer A1 is an organic insulating film made of, for example, a silicone-based resin, and is referred to as an OCA (Optical Clear Adhesive). In the example shown in FIG. 8, the adhesive layer A1 is arranged over the front surface between the back surface CV1b of the cover member CV1 and the front surface 20f of the substrate 20. In other words, the sheet-shaped adhesive layer A1 is attached to the entire front surface 20f of the substrate 20. Since the adhesive layer A1 transmits visible light as described above, even if the adhesive layer A1 is interposed in the display region DA, the visible light is transmitted through the adhesive layer A1.

In the case of the display device DSP3, since the entire front surface 20f of the substrate 20 including the display region DA is covered with the adhesive layer A1, most of the light source light L1 passes through the cover member CV1 and is reflected by the light reflection film RF without being reflected by the front surface 20f of the substrate 20 as shown in FIG. 8. When the light source light L1 is reflected by the light reflection film RF, the reflected light by the light reflection film RF is attenuated with respect to the original incident light. In this case, the light source light L1 incident from the side surface 20s1 of the substrate 20 is attenuated until it reaches the side surface on the opposite side of the side surface 20s1, and the brightness of the emitted light L2 is decreased in the vicinity of the side surface on the opposite side of the side surface 20s1 as compared with that in the vicinity of the side surface 20s1. Hereinafter, this phenomenon will be referred to as "deterioration of brightness gradient".

Also in the above-described cases of the display device DSP1 shown in FIG. 6 and the display device DSP2 shown in FIG. 7, the light source light L1 is reflected by the light reflection film RF. Therefore, the above-mentioned deterioration of brightness gradient may occur in each of the display devices DSP1 and DSP2. An effective aspect as a countermeasure for "deterioration of brightness gradient" will be described below as a second modification. Since the display device DSP3 shown in FIG. 8 is the same as the display device DSP2 shown in FIG. 7 except for the above-mentioned differences, duplicate description will be omitted.

<Second Modification>

Figure 9:
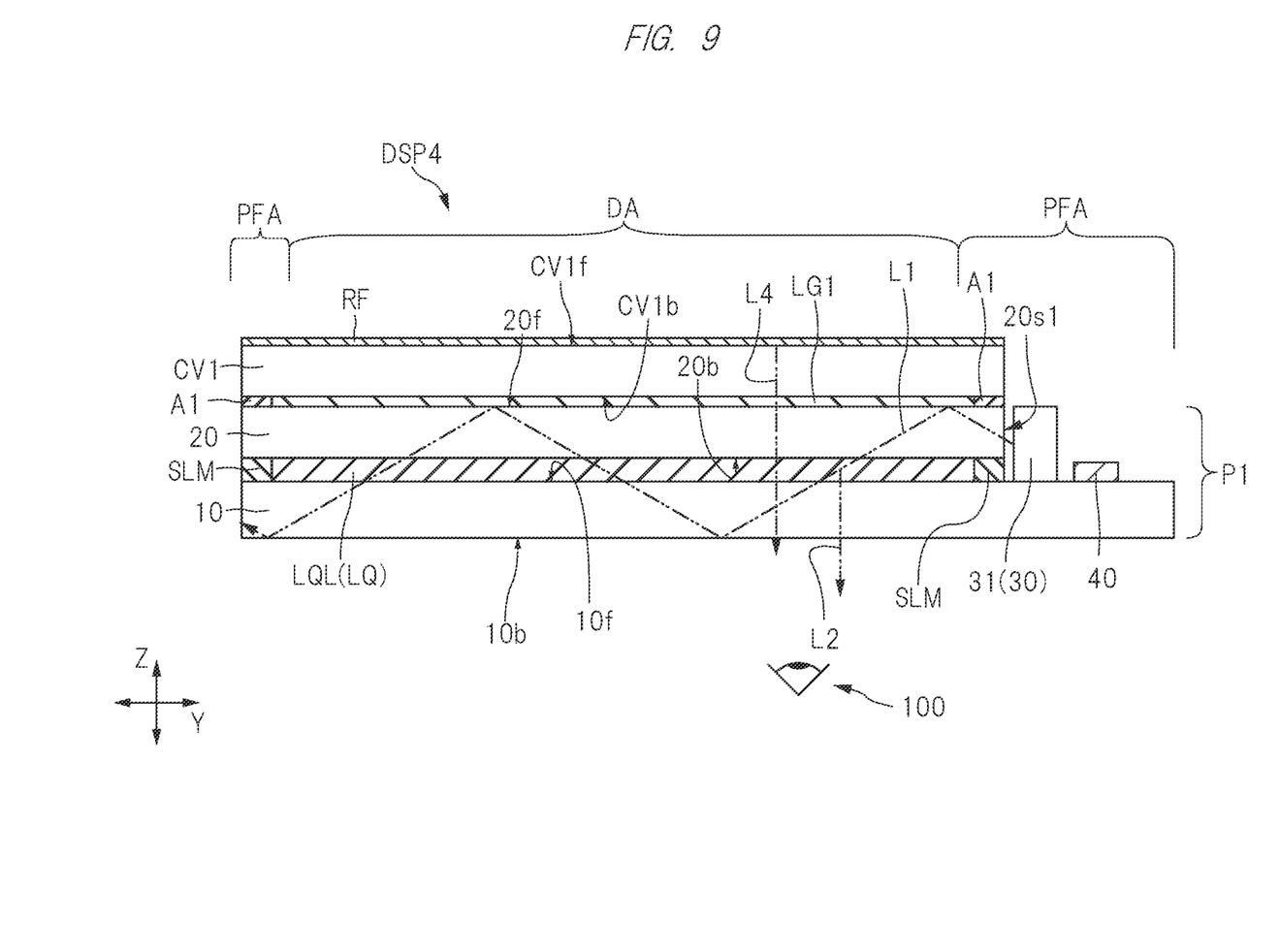
FIG. 9 is a cross-sectional view showing a modification of the display device shown in FIG. 8.
Figure 10:
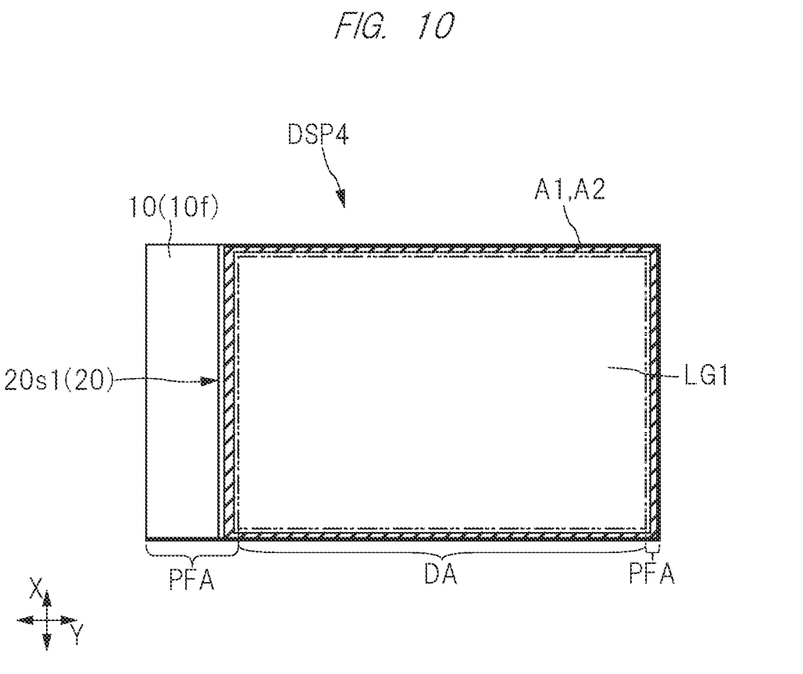
FIG. 10 is a plan view showing a planar layout of an adhesive layer shown in FIG. 9.
Figure 11:
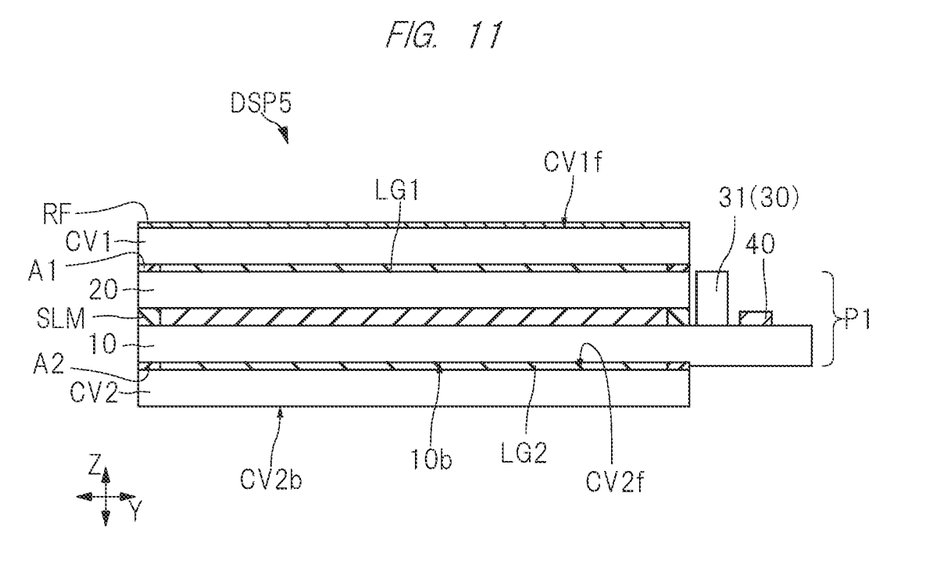
FIG. 11 is a cross-sectional view showing a modification of the display device shown in FIG. 9.
Figure 13:
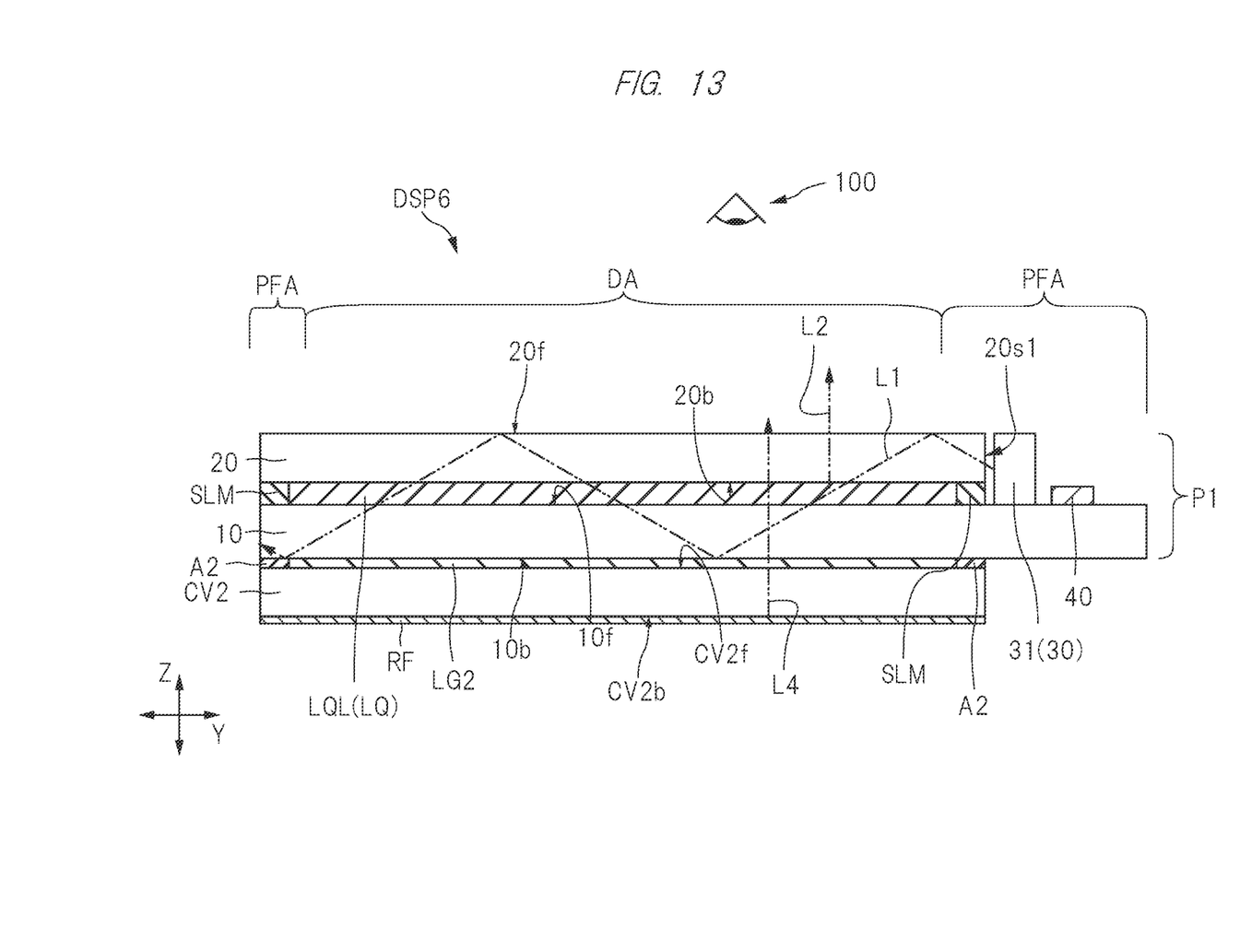
FIG. 13 is a cross-sectional view showing another modification of the display device shown in FIG. 9.
Figure 14:
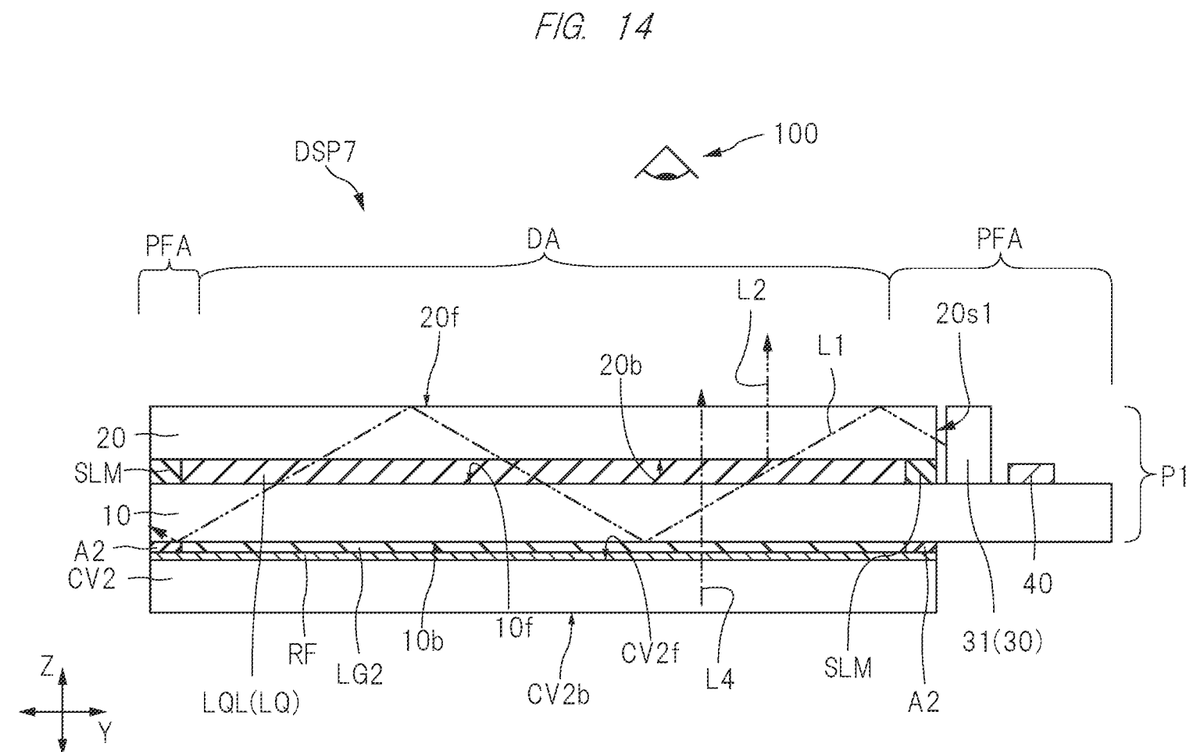
FIG. 14 is a cross-sectional view showing another modification of the display device shown in FIG. 13.

FIG. 9 is a cross-sectional view showing a modification of the display device shown in FIG. 8. FIG. 10 is a plan view showing a planar layout of an adhesive layer shown in FIG. 9. Although FIG. 10 is a plan view, hatching is applied to the adhesive layer A1. Further, since the planar shape of an adhesive layer A2 described later in FIG. 11, FIG. 13, and FIG. 14 is the same as that of the adhesive layer A1 shown in FIG. 10, the reference character of the adhesive layer A2 is also shown in FIG. 10. The display device DSP4 shown in FIG. 9 and FIG. 10 differs from the display device DSP3 shown in FIG. 8 in the following points. That is, the adhesive layer A1 of the display device DSP4 is arranged in a frame shape in the peripheral region PFR. As shown in FIG. 9, a gas layer LG1 surrounded by the adhesive layer A1, the front surface 20f of the substrate 20, and the cover member CV1 is interposed between the cover member CV1 and the substrate 20.

As shown in FIG. 9, in the case of the display device DSP4, the gas layer LG1 is interposed between the light reflection film RF and the substrate 20 in the display region DA. The gas layer LG1 is, for example, a space filled with air. In the propagation path of the light source light L1, the front surface 20f of the substrate 20 is an interface between a medium having a large refractive index (gas layer LG1) and a medium having a small refractive index (substrate 20). Therefore, when the incident angle at which the light source light L1 is incident on the front surface 20f is larger than the critical angle, the light source light L1 is totally reflected on the front surface 20f. Since the difference in refractive index between the material constituting the substrate 20 and the gas layer LG1 is large, the light source light L1 that reaches the front surface 20f of the substrate 20 is likely to be totally reflected. Further, when the light source light L1 is totally reflected at the interface between the front surface 20f and the gas layer LG1, the degree of attenuation of the light source light L1 is negligibly small. In the case of the display device DSP4, since the light source light L1 is difficult to reach the light reflection film RF, it is possible to suppress the "deterioration of brightness gradient" as compared with the display device DSP1 shown in FIG. 6, the display device DSP2 shown in FIG. 7, and the display device DSP3 shown in FIG. 8.

In the example shown in FIG. 10, the adhesive layer A1 is not arranged in the display region DA. From the viewpoint of suppressing the deterioration of brightness gradient, it is particularly preferable that the adhesive layer A1 is not arranged in the display region DA as shown in FIG. 10. However, the range in which the adhesive layer A1 is arranged is determined by the adhesive strength. Therefore, a part of the adhesive layer A1 may be arranged in the display region DA in some cases. Since the display device DSP4 shown in FIG. 9 and FIG. 10 is the same as the display device DSP3 shown in FIG. 8 except for the above-mentioned differences, duplicate description will be omitted.

<Third Modification>

FIG. 11 is a cross-sectional view showing a modification of the display device shown in FIG. 9. The display device DSP5 shown in FIG. 11 differs from the display device DSP4 shown in FIG. 9 in the following points. That is, the display device DSP5 further includes a cover member CV2. The cover member CV2 has a front surface CV2f facing the back surface 10b of the substrate 10 and a back surface CV2b on the opposite side of the front surface CV2f. The cover member CV2 is adhered and fixed on the back surface 10b of the substrate 10 via the adhesive layer A2. The light reflection film RF is formed on the front surface CV1f of the cover member CV1 in the same manner as the display device DSP4 shown in FIG. 9.

The cover member CV2 is, for example, a glass plate like the cover member CV1. The adhesive layer A2 is an organic insulating film (OCA) made of, for example, a silicone-based resin like the adhesive layer A1. In the case of the display device DSP5, the cover member CV2 is not a member provided for forming the light reflection film RF, but the substrate 10 in the display region DA can be protected by attaching the cover member CV2 on the side with the back surface 10b of the substrate 10.

The adhesive layer A2 of the display device DSP5 is arranged in a frame shape in the peripheral region PFR (see FIG. 10). A gas layer LG2 surrounded by the adhesive layer A2, the back surface 10b of the substrate 10, and the cover member CV2 is interposed between the cover member CV2 and the substrate 10. Since the display device DSP5 shown in FIG. 11 is the same as the display device DSP4 shown in FIG. 9 except for the above-mentioned differences, duplicate description will be omitted.

<Double Image Phenomenon>

Figure 12:
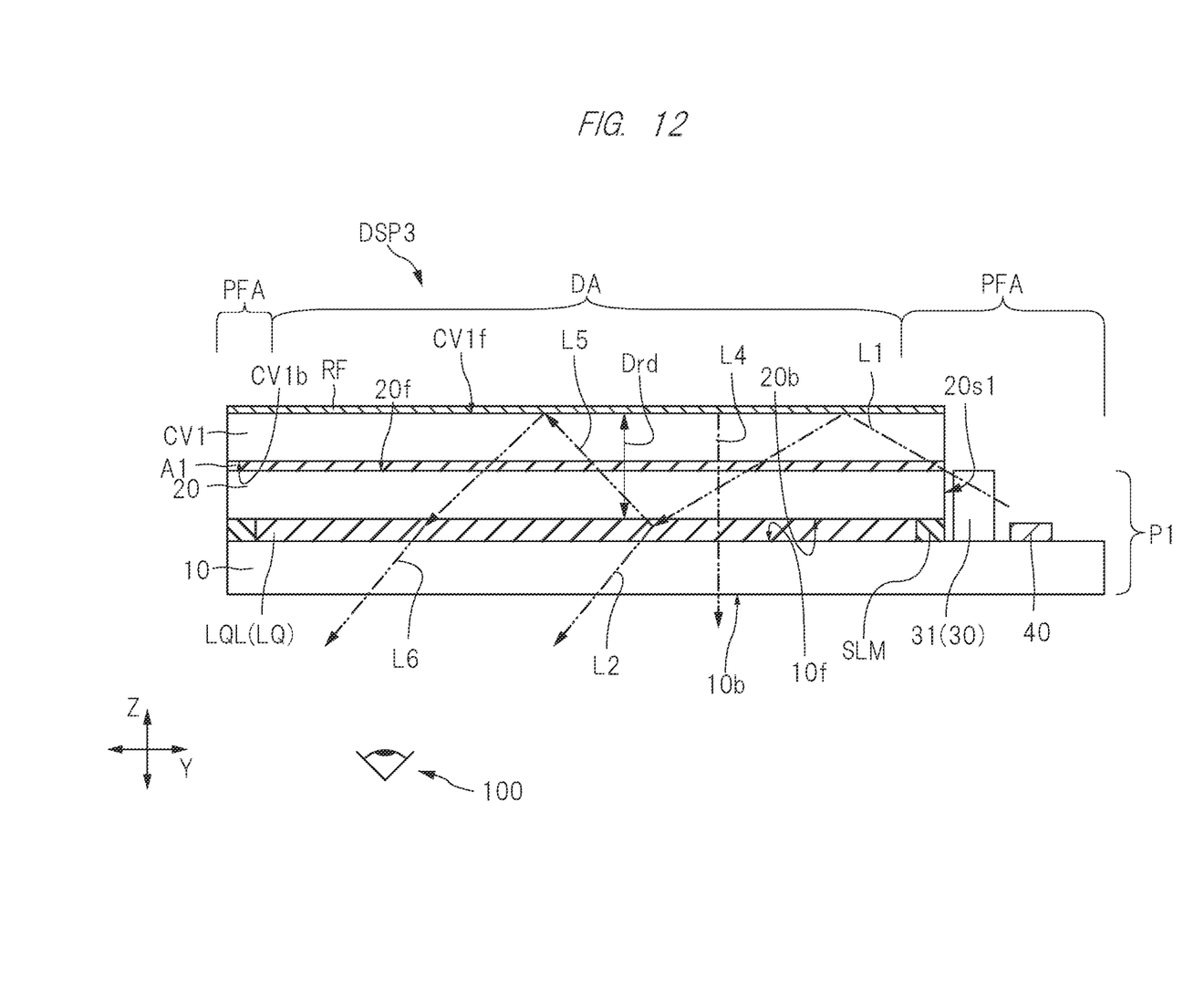
FIG. 12 is a cross-sectional view schematically showing a mechanism of the double image phenomenon that occurs in the display device DSP3 shown in FIG. 8.

Next, the double image phenomenon will be described. FIG. 12 is a cross-sectional view schematically showing a mechanism of the double image phenomenon that occurs in the display device DSP3 shown in FIG. 8. In the case of the display device DSP3, in the state where a voltage is applied to the liquid crystal LQ, the optical axes of the liquid crystal polymer and the liquid crystal molecules intersect each other, and the light source light L1 incident on the liquid crystal LQ is scattered in the liquid crystal layer LQL (scattering state). In the scattering state, the light source light L1 is emitted as the emitted light L2 by the liquid crystal LQ from the side with the back surface 10b to the outside of the display device DSP3. The observer 100 can recognize the emitted light L2 as the image by the display function.

However, the light scattered in the liquid crystal layer LQL in the scattering state is not only the emitted light L2, but the light emitted toward the light reflection film RF is generated like the scattered light L5 shown in FIG. 12. The scattered light L5 is reflected by the light reflection film RF and is emitted as the emitted light L6 from the back surface 10b to the outside. As a result, the emitted light L2 and the emitted light L6 are recognized by the observer 100 as double images. When the separation distance between the emitted light L2 and the emitted light L6 on the back surface 10b is small, the observer 100 hardly recognizes the double images.

On the other hand, when the separation distance between the emitted light L2 and the emitted light L6 on the back surface 10b is large, the double images become conspicuous as erroneous display that the observer can recognize. The separation distance between the emitted light L2 and the emitted light L6 on the back surface 10b becomes large in proportion to the distance Drd in the Z direction from the scattering layer in which the scattered light L5 is generated, that is, the liquid crystal layer LQL to the light reflection film RF by which the scattered light L5 is reflected. Namely, by reducing the distance Drd, the influence of the double image phenomenon can be reduced to a negligible level.

The following method is effective as a method for reducing the distance Drd shown in FIG. 12. First, in the case of the display device DSP1 shown in FIG. 6 and the display device DSP2 shown in FIG. 7, since the light reflection film RF is directly formed on the substrate 20 or the substrate 10, the distance from the liquid crystal layer LQL to the light reflection film RF can be shortened as compared with the display device DSP3 shown in FIG. 12. Further, in the case of the display device DSP4 shown in FIG. 9, the distance from the liquid crystal layer LQL to the light reflection film RF is the same as that of the display device DSP3 shown in FIG. 12. However, in the case of the display device DSP4, even when the scattered light L5 shown in FIG. 12 is generated, there is a high possibility that the scattered light L5 is reflected at the interface between the substrate 20 and the gas layer LG1. Therefore, in the case of the display device DSP4, the distance between the liquid crystal layer LQL in which the light source light L1 is scattered and the reflection surface (the interface between the substrate 20 and the gas layer LG1) by which the scattered light L5 (see FIG. 12) is reflected can be made smaller, so that the influence of the double image phenomenon can be reduced.

<Fourth Modification>

FIG. 13 is a cross-sectional view showing another modification of the display device shown in FIG. 9. The display device DSP6 shown in FIG. 13 differs from the display device DSP4 shown in FIG. 9 in the following points. That is, the display device DSP6 does not have the cover member CV1 shown in FIG. 9, and further has the cover member CV2. The cover member CV2 has the front surface CV2f facing the back surface 10b of the substrate 10 and the back surface CV2b on the opposite side of the front surface CV2f. The cover member CV2 is adhered and fixed on the back surface 10b of the substrate 10 via the adhesive layer A2. The light reflection film RF is formed on the back surface CV2b of the cover member CV2.

Since the adhesive layer A2 and the cover member CV2 of the display device DSP6 are the same as those of the display device DSP5 described with reference to FIG. 11, duplicate description will be omitted. In the case of the display device DSP6, since the light reflection film RF is formed on the side with the back surface 10b of the substrate 10, the observer 100 visually recognizes the display image and the reflected image from the front of the front surface 20f of the substrate 20.

Though not shown, as a modification of the display device DSP6, the adhesive layer A2 may be in close contact with the entire back surface 10b of the substrate 10 in the display region DA. However, the configuration shown in FIG. 13 is preferable from the viewpoint of suppressing the above-mentioned "deterioration of brightness gradient" or from the viewpoint of reducing the influence of the "double image phenomenon". Namely, the adhesive layer A2 of the display device DSP6 is arranged in a frame shape in the peripheral region PFR (see FIG. 10). The gas layer LG2 surrounded by the adhesive layer A2, the back surface 10b of the substrate 10, and the cover member CV2 is interposed between the cover member CV2 and the substrate 10. As a result, the light source light L1 is totally reflected at the interface between the front surface 20f of the substrate 10 and the outside and at the interface between the back surface 10b of the substrate 10 and the gas layer LG2, respectively. Since the display device DSP6 shown in FIG. 13 is the same as the display device DSP4 shown in FIG. 9 except for the above-mentioned differences, duplicate description will be omitted.

<Fifth Modification>

Next, a preferable aspect from the viewpoint of protecting the light reflection film will be described. FIG. 14 is a cross-sectional view showing another modification of the display device shown in FIG. 13. The display device DSP7 shown in FIG. 14 differs from the display device DSP6 shown in FIG. 13 in the following points. That is, the light reflection film RF of the display device DSP7 is formed on the front surface CV2f of the cover member CV2 and is adhered and fixed on the substrate 10 via the adhesive layer A2.

Since the light reflection film RF is covered with the cover member CV2 in the case of the display device DSP7, it is preferable as compared with other examples in the point that it is possible to protect the light reflection film RF. Further, in the case of the display device DSP7, the front surface CV2f of the cover member CV2 on which the light reflection film RF is formed faces the back surface 10b of the substrate 10. As a modification, when considering the case where the adhesive layer A2 is in close contact with the entire back surface 10b of the substrate 10 in the display region DA, the scattered light L5 described with reference to FIG. 12 is reflected at the interface between the light reflection film RF and the adhesive layer A2 shown in FIG. 14. In this case, since the distance between the liquid crystal layer LQL in which the light source light L1 is scattered and the reflection surface (the interface between the light reflection film RF and the adhesive layer A2) by which the scattered light L5 (see FIG. 12) is reflected can be reduced, the influence of the double image phenomenon can be reduced.

On the other hand, when considering the "deterioration of brightness gradient", it is preferable to prevent the light source light L1 from being reflected by the light reflection film RF. Therefore, the structure of the display device DSP7 shown in FIG. 14 is particularly preferable. Namely, the adhesive layer A2 of the display device DSP7 is arranged in a frame shape in the peripheral region PFR (see FIG. 10). The gas layer LG2 surrounded by the adhesive layer A2, the back surface 10b of the substrate 10, and the light reflection film RF is interposed between the light reflection film RF and the substrate 10. As a result, the light source light L1 is totally reflected at the interface between the front surface 20f of the substrate 10 and the outside and at the interface between the back surface 10b of the substrate 10 and the gas layer LG2, respectively.

By the way, from the viewpoint of improving the reflection characteristics of the light reflection film, it is preferable to increase the flatness of the reflection surface. As a method of increasing the flatness of the reflection surface, a method of forming the light reflection film RF in the state where the base surface of the cover member CV2 (or the cover member CV1 shown in FIG. 8, FIG. 9, and FIG. 11) on which the light reflection film RF is formed is flattened is the easiest. On the other hand, in the case of the display device DSP7, since the surface of the light reflection film RF on the opposite side of the surface facing the cover member CV2 serves as the reflection surface, it is difficult to flatten the surface in terms of the manufacturing process. Therefore, from the viewpoint of easily increasing the flatness of the reflection surface of the light reflection film RF, the above-mentioned display devices DSP1 to DSP6 are more preferable than the display devices DSP7. Since the display device DSP7 shown in FIG. 14 is the same as the display device DSP6 shown in FIG. 13 except for the above-mentioned differences, duplicate description will be omitted.

The embodiment and typical modifications have been described above, but the above-mentioned technology can be applied to various modifications other than the illustrated modifications. For example, the above-mentioned modifications may be combined with each other.

A person having ordinary skill in the art can make various modifications and corrections within a range of the idea of the present invention, and it is interpreted that the modifications and corrections also belong to the scope of the present invention. For example, the embodiments obtained by performing addition or elimination of components or design change or the embodiments obtained by performing addition or reduction of process or condition change to the embodiments described above by a person having an ordinary skill in the art are also included in the scope of the present invention as long as they include the gist of the present invention.

The present invention can be applied to a display device and an electronic equipment in which the display device is incorporated.

What is claimed is:

1. A display device having mirror function comprising:
a display region;
a peripheral region provided so as to surround the display region;
a first substrate having a first front surface and a first back surface on an opposite side of the first front surface;
a second substrate having a second back surface facing the first front surface, a second front surface on an opposite side of the second back surface, and a first side surface which is located between the second front surface and the second back surface and intersects with the second front surface and the second back surface;
a liquid crystal layer arranged between the first substrate and the second substrate;
a first cover member which has a third back surface facing the second front surface and a third front surface on an opposite side of the third back surface and is adhered and fixed on the second front surface of the second substrate via a first adhesive layer;
a second cover member which has a fourth front surface facing the first back surface and a fourth back surface on an opposite side of the fourth front surface and is adhered and fixed on the first back surface of the first substrate via a second adhesive layer;
a light source device mounted on the first front surface of the first substrate and arranged at a position facing the first side surface of the second substrate; and
a light reflection film formed on either a side with the first back surface of the first substrate or a side with the second front surface of the second substrate,
wherein the light reflection film covers the entire display region,
wherein the light reflection film has an optical property of specular reflecting visible light,
wherein the second adhesive layer is arranged in a frame in the peripheral region, and
wherein a second gas layer surrounded by the second adhesive layer, the first back surface of the first substrate, and the second cover member is interposed between the first substrate and the second cover member.

2. The display device having mirror function according to claim 1,
wherein the light reflection film is formed on the third front surface of the first cover member.

3. The display device having mirror function according to claim 2,
wherein the first adhesive layer is arranged in a frame shape in the peripheral region, and
wherein a first gas layer surrounded by the first adhesive layer, the second front surface of the second substrate, and the first cover member, is interposed between the first cover member and the second substrate.

4. A display device having mirror function comprising:
a display region;
a peripheral region provided so as to surround the display region;
a first substrate having a first front surface and a first back surface on an opposite side of the first front surface;
a second substrate having a second back surface facing the first front surface, a second front surface on an opposite side of the second back surface, and a first side surface which is located between the second front surface and the second back surface and intersects with the second front surface and the second back surface;
a liquid crystal layer arranged between the first substrate and the second substrate;
a second cover member which has a fourth front surface facing the first back surface and a fourth back surface on an opposite side of the fourth front surface and is adhered and fixed on the first back surface of the first substrate via a second adhesive layer;

a light source device mounted on the first front surface of the first substrate and arranged at a position facing the first side surface of the second substrate; and a light reflection film formed on either a side with the first back surface of the first substrate or a side with the second front surface of the second substrate, wherein the light reflection film covers the entire display region, wherein the light reflection film has an optical property of specular reflecting visible light, wherein the second adhesive layer is arranged in a frame shape in the peripheral region, and wherein a second gas layer surrounded by the second adhesive layer, the first back surface of the first substrate, and the second cover member, is interposed between the first substrate and the second cover member.

5. The display device having mirror function according to claim 4, wherein the light reflection film is formed on the fourth back surface of the second cover member.

6. The display device having mirror function according to claim 4, wherein the light reflection film is formed on the fourth front surface of the second cover member and is adhered and fixed on the first substrate via the second adhesive layer.

* * * * *